United States Patent [19]

Hori et al.

[11] 4,313,531

[45] Feb. 2, 1982

[54] VISCOUS FLUID COUPLING

[75] Inventors: Takanobu Hori; Masaharu Hayashi, both of Toyota, Japan

[73] Assignee: Aisin Seiki Kabushiki Kaisha, Kariya, Japan

[21] Appl. No.: 109,194

[22] Filed: Jan. 3, 1980

[30] Foreign Application Priority Data

Feb. 8, 1979 [JP] Japan .................................. 54-15710

[51] Int. Cl.³ .................... F16D 43/25; F16D 35/00
[52] U.S. Cl. ............................... 192/58 B; 192/82 T
[58] Field of Search .......................... 192/58 B, 82 T

[56] References Cited

U.S. PATENT DOCUMENTS

| | | | |
|---|---|---|---|
| 3,011,754 | 12/1961 | Ander | 192/58 B X |
| 3,559,786 | 2/1971 | Long, Jr. | 192/82 T X |
| 4,103,765 | 8/1978 | Tinholt | 192/58 B |
| 4,188,785 | 2/1980 | Ando | 192/58 B X |
| 4,190,140 | 2/1980 | Konkle | 192/58 B X |

FOREIGN PATENT DOCUMENTS 2825848 1/1979 Fed. Rep. of Germany .... 192/82 T

*Primary Examiner*—Allan D. Herrmann
*Attorney, Agent, or Firm*—Oblon, Fisher, Spivak, McClelland & Maier

[57] ABSTRACT

A viscous fluid coupling including a rotatable casing provided with a fluid operating chamber and a fluid reservoir chamber therein and having an axial opening formed in said casing, a rotor located in the fluid operating chamber and rotatable relative to the casing, a valve shaft rotatably received in the axial opening formed in the casing, a valve member 27 fixed to an inner end of the valve shaft and operable to control fluid communication between the fluid operating chamber and the fluid reservoir chamber, a bimetal coil located on an exterior portion of the casing, the bimetal coil being connected at inner and outer ends thereof to an outer end of the valve shaft and the casing, respectively, and a plurality of sealing rings axially spaced and interposed between the outer periphery of the valve shaft and a wall of the opening wherein the sealing rings include a resilient material.

6 Claims, 4 Drawing Figures

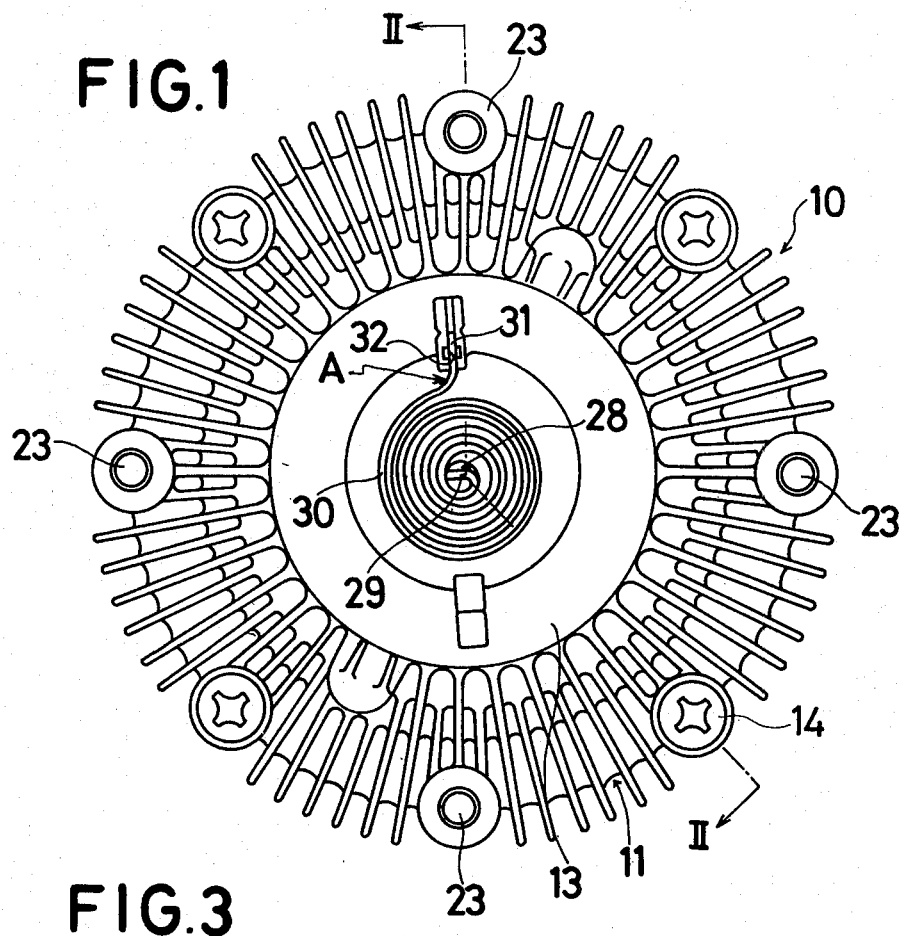
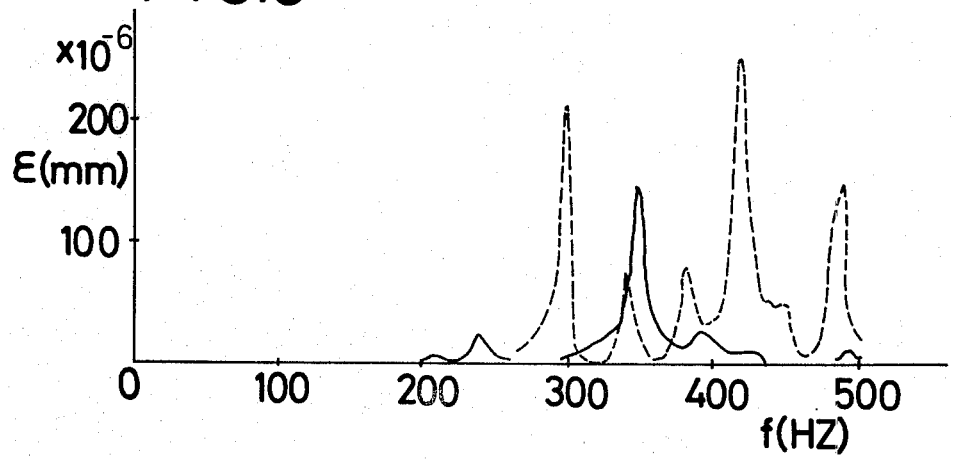

VISCOUS FLUID COUPLING

BACKGROUND OF THE INVENTION

1. Field of the Invention

The present invention relates to a viscous fluid coupling for connecting the engine of an automotive vehicle to a cooling fan for an engine radiator, and more particularly, to a viscous fluid coupling of a temperature responsive type in which a bimetal coil located on the exterior of a rotatable casing operates a valve member for controlling the flow of viscous fluid within the casing in response to the temperature of air flow through the engine radiator.

2. Description of the Prior Art

In conventional viscous fluid couplings of this type, a bimetal coil is located on the exterior of a rotatable casing connected to a cooling fan so as to respond to the temperature of air flowing through an engine radiator. The bimetal coil is connected at an outer portion thereof to the casing and is connected at an inner portion thereof to an outer end of a valve shaft which is aligned with the rotational axis of the casing and is rotatably supported within an opening formed in the casing. An inner end portion of the valve shaft is connected to a valve member for controlling the flow of a viscous fluid within the casing. In order to prevent the viscous fluid from leakage, a single sealing ring is provided between the outer periphery of the valve shaft and a wall of the opening of the casing.

In such arrangement, objectionable wear has been experienced on the valve shaft and the wall of the opening of the casing upon use of the coupling. In addition, breakage of the outer end portion of the bimetal coil has occurred upon use of the coupling. The reason why such problems are caused is that the bimetal coil and the valve member resonate due to the vibration transmitted from the engine to the casing and thus exerts radial forces of different magnitude on opposite ends of the valve shaft wherein the valve shaft is slanted largely about a fulcrum of the sealing ring.

SUMMARY OF THE INVENTION

It is one object of the present invention to solve the above-noted problems found in the prior art.

Another object of the present invention is to provide a fluid coupling including an improved sealed mounting construction between a wall of an opening of a casing and the outer periphery of a valve shaft which prevents the valve shaft from striking the wall of the opening and serves to dampen slanting movement of the valve shaft.

A further object of the present invention is to provide a fluid coupling including a sealed mounting construction which may be simple and inexpensively manufactured.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein:

FIG. 1 is an elevational view of an embodiment of a viscous fluid coupling according to the present invention;

FIG. 3 is a graph showing the relation between the frequency of vibrations and the magnitude of strain on a portion A shown in FIG. 1 of a bimetal coil.

DETAILED DESCRIPTION OF THE PREFERRED EMBODIMENT

Figure 2:
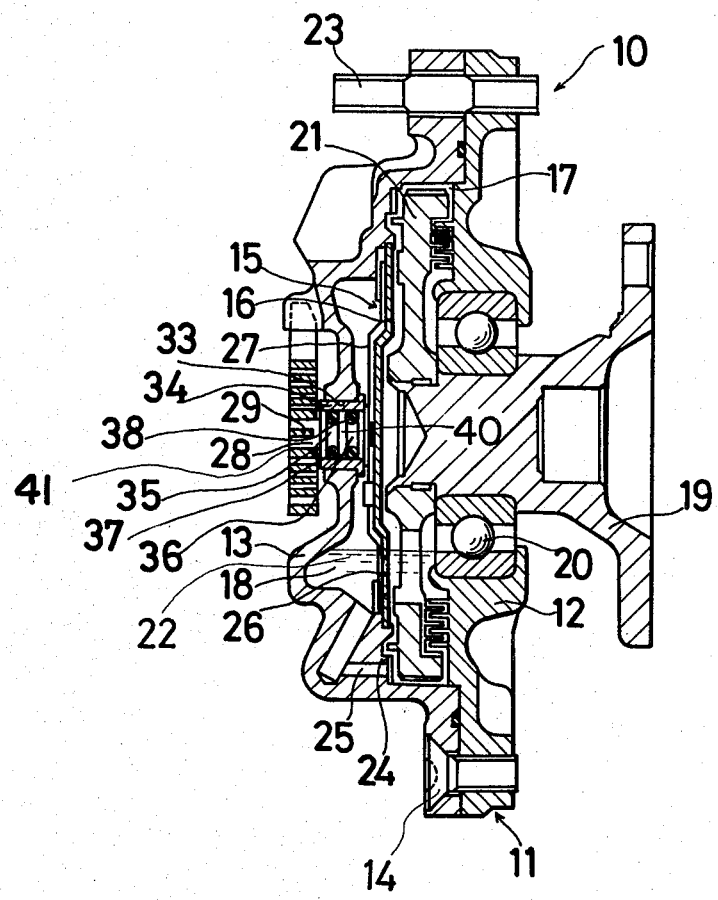
FIG. 2 is a sectional view taken along line II—II of FIG. 1.

Referring now to FIGS. 1 and 2, a viscous fluid coupling 10 according to the present invention includes a casing 11 formed with a body member 12 and a cover member 13 sealingly fixed thereto by screws 14 to define a cavity 15 which is divided by a dividing plate 16 fixed to the casing 11 into a fluid operating chamber 17 and a fluid reservoir chamber 18. An input shaft 19 mounted on an engine (not shown) and driven by the engine is supported for rotation on the casing 11 by a bearing 20.

A rotor 21 is fixed to one end of the input shaft 19 and is located within the fluid operating chamber 17. Viscous fluid 22 is provided within the cavity 15 to transfer the torque from the rotor 21 to the casing 11, both of which constitute rotary members of the coupling. Such torque transfer is well known in the art and is accomplished by viscous shear between mating surfaces of the rotor 21 and the casing 11.

The magnitude of the torque transferred from the rotor 21 to the casing 11 is dependent on the volume of the viscous fluid in the operating chamber 17. Studs 23 are fixedly provided on the casing 11 for fixing a cooling fan (not shown) to the casing 11.

In order to vary the volume of the viscous fluid in the operating chamber 17 in response to the temperature of air flowing through an engine radiator (not shown), the cover member 13 is provided with a pump projection 24 and a discharge passage 25. The pump projection 24 acts to pump the viscous fluid from the operating chamber 17 into the reservoir chamber 18 through the discharge passage 25 upon the rotation of the coupling 10.

The dividing plate 16 is provided with an inlet passage 26 which permits the viscous fluid to flow back from the reservoir chamber 18 into the operating chamber 17. Control of the variation in flow of the viscous fluid in the operating chamber 17 is effected by controlling the fluid flow through the inlet passage 26 by means of a valve member 27 located in the reservoir chamber 18. The valve member 27 is fixed to an inner or second end portion 40 of a valve shaft 28 which is rotatably and sealingly mounted on the casing 11.

An outer or first end portion 41 the valve shaft 28 is fixedly connected to an inner end 29 of a bimetal coil 30 located on the exterior portion of the casing 11. An outer end 31, which is radially extended, of the bimetal coil 30 is received in a radial slot 32 formed on the casing 11 so as to rotate the valve shaft 28 relative to the casing 11 in response to the temperature of the air flow.

Referring to the sealingly mounted construction for valve shaft 28, the cover member 13 is provided at the rotational center thereof with an opening 33 which is provided with a tubular bushing 34 sealingly and fixedly inserted in cover member 13. Bushing 34 may be omitted if desired so as to reduce the cost.

The valve shaft 28 is rotatably received within the opening 33 and is provided on the outer periphery thereof with axially spaced annular grooves 35 and 36 which receive sealing rings 37 and 38, respectively. Grooves 35 and 36 may be provided on a wall of opening 33. Sealing rings 37 and 38 are made of resilient material such as rubber. Thus, the sealing rings receive all of the radial loads imposed upon valve shafts 28 and act to prevent viscous fluid in casing 11 from leaking and cooperate to prevent valve shaft 28 from slanting movement thereof in opening 33, thereby causing a damping effect with respect to any possible vibratory slanting movement of valve shaft 28 due to resonations of bimetal coil 30 and valve member 27 due to vibration transmitted from the engine to casing 11.

As a result of the damping effect caused by sealing rings 37 and 38 to the vibratory slanting movement of valve shaft 28, valve shaft 28 is prevented from severely hitting the wall of opening 33 to thereby eliminate objectionable wear on valve shaft 28 and on the wall of opening 33. In addition, bimetal coil 30 is prevented from experiencing a sudden increase in stress and strain in and on bent portion A, shown in FIG. 1 thereof defining outer end 32, so as to thereby avoid breakage of bimetal coil 30.

Figure 4:
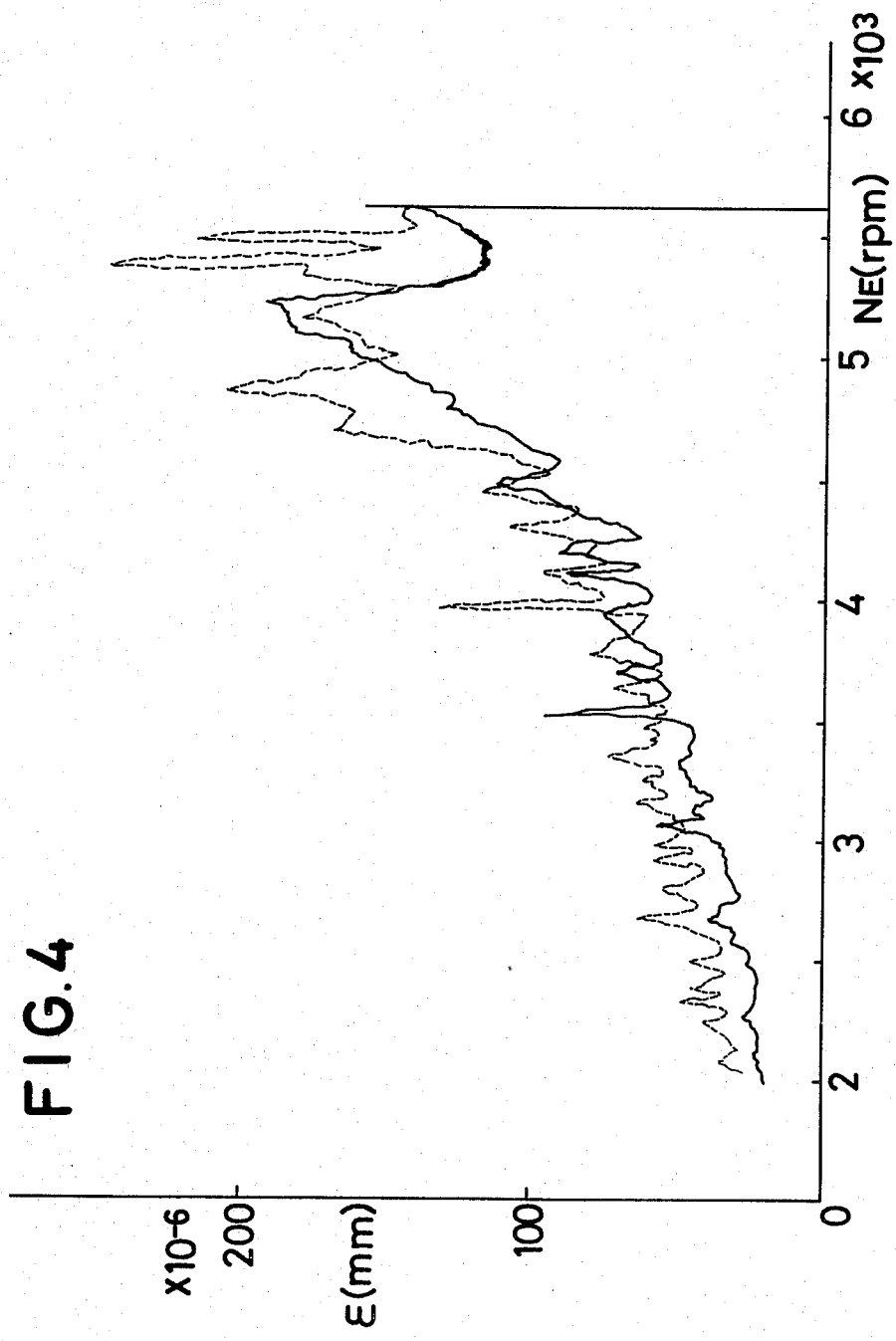
FIG. 4 is a graph showing the relation between the revolutionary speed of the engine and the magnitude of strain at portion A of the bimetal coil.

In FIG. 3 is shown the result of tests referring to the relation between frequency of vibration and magnitude of strain $\epsilon$ on portion A of bimetal coil 30. FIG. 4 shows the result of tests referring to the relation between the revolutionary speed $N\epsilon$ of the engine and the magnitude of strain on portion A of bimetal coil 30. Solid lines in FIGS. 3 and 4 correspond with viscous fluid coupling 10 shown in FIGS. 1 and 2, and broken lines in FIGS. 3 and 4 correspond with a conventional viscous fluid coupling, the difference of which from coupling 10 is such that a single sealing ring is provided between valve shaft 28 and opening 33 in the conventional coupling.

Obviously, many modifications and variations of the present invention as possible in light of the above teachings. It is therefore to be understood that within the scope of the appended claims the invention may be practiced otherwise than as specifically described herein.

What is claimed as new and desired to be secured by Letters Patent of the United States is:

1. A viscous fluid coupling comprising:
    a rotatable casing provided with a fluid operating chamber and a fluid reservoir chamber therein and having an axial opening formed in said casing;
    a rotor located in said fluid operating chamber and rotatable relative to said casing;
    a valve shaft rotatably received in said axial opening formed in said casing;
    a valve member fixed to an inner end of said valve shaft and operable to control fluid communication between said fluid operating chamber and said fluid reservoir chamber;
    a bimetal coil located on an exterior portion of said casing, said bimetal coil being connected at inner and outer ends thereof to said valve shaft and said casing, respectively;
    said valve shaft comprising a first end portion connected to said coil and a second end portion opposite said first end portion having a uniform diameter;
    said second end portion of said shaft comprising a plurality of annular grooves formed therein; and
    a plurality of sealing rings disposed within said annular grooves and axially spaced and interposed between the outer periphery of said valve shaft and a wall of said opening such that said sealing rings receive the entire radial load placed upon said shaft and wherein said sealing rings comprise a resilient material.

2. A viscous fluid coupling according to claim 1, wherein said plurality of sealing rings comprises a first and second sealing ring.

3. A viscous fluid coupling according to claim 1, wherein said resilient material comprises rubber.

4. A viscous fluid coupling according to claim 1, wherein said plurality of sealing rings comprises a first and second sealing ring and wherein said resilient material comprises rubber.

5. A viscous fluid coupling according to claim 1 or 2, said casing further comprising:
    an opening formed therein at the rotational center thereof and a bushing member positioned in said opening in said casing wherein said plurality of sealing rings are positioned within said bushing member.

6. A viscous fluid coupling according to claim 1, said casing further comprising:
    a radial slot formed therein within which said outer end of said bimetal coil is positioned.

* * * * *